United States Patent
Aoyama et al.

(10) Patent No.: US 9,341,922 B2
(45) Date of Patent: May 17, 2016

(54) IMAGING APPARATUS

(75) Inventors: Keisuke Aoyama, Kawasaki (JP); Takeshi Sakaguchi, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/463,449

(22) Filed: May 3, 2012

(65) Prior Publication Data

US 2012/0288264 A1 Nov. 15, 2012

(30) Foreign Application Priority Data

May 10, 2011 (JP) ................................. 2011-105427

(51) Int. Cl.
  *G03B 3/10* (2006.01)
  *G03B 13/36* (2006.01)
  *H04N 5/232* (2006.01)

(52) U.S. Cl.
  CPC ............ *G03B 13/36* (2013.01); *H04N 5/23212* (2013.01)

(58) Field of Classification Search
  USPC .............................. 396/95, 121, 137; 348/345
  See application file for complete search history.

(56) References Cited

U.S. PATENT DOCUMENTS

| | | | |
|---|---|---|---|
| 5,659,817 A * | 8/1997 | Fujino et al. | 396/137 |
| 6,654,559 B2 * | 11/2003 | Aoyama | 396/266 |
| 2011/0273606 A1 * | 11/2011 | Hara | 348/333.02 |

FOREIGN PATENT DOCUMENTS

| | | |
|---|---|---|
| CN | 101241296 A | 8/2008 |
| JP | 2004-184432 A | 7/2004 |
| JP | 2009-015117 A | 1/2009 |
| JP | 2009-069942 A | 4/2009 |
| JP | 2011-039457 A | 2/2011 |
| JP | 2011-053300 A | 3/2011 |

* cited by examiner

*Primary Examiner* — Minh Phan
(74) *Attorney, Agent, or Firm* — Canon U.S.A., Inc. IP Division

(57) ABSTRACT

A control apparatus controls an imaging apparatus that includes a focus detection unit configured to detect a focus state of an image forming optical system. The control apparatus includes a collectively setting unit configured to read initial setting values corresponding to a selected operation mode from a storage unit, and set setting values of a plurality of setting items to initial setting values, and a setting value changing unit configured to individually change setting values of the setting items set by the collectively setting unit and store the changed setting values in the storage unit. An operation of the focus detection unit is controlled by the operation mode in which the setting values have been changed by the setting value changing unit.

9 Claims, 10 Drawing Sheets

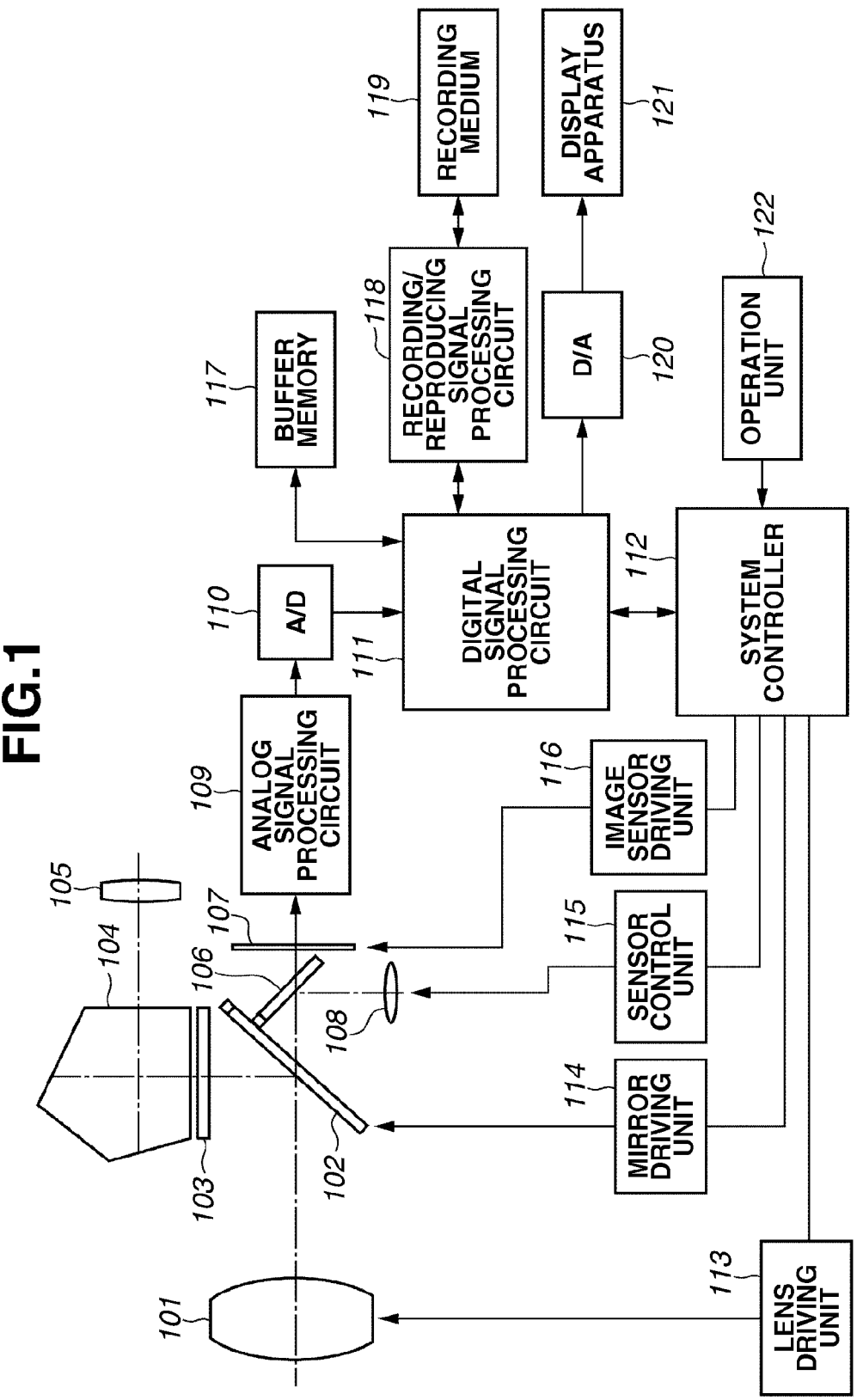

IMAGING APPARATUS

BACKGROUND OF THE INVENTION

1. Field of the Invention

The present invention relates to improvement in an imaging apparatus suitably used for a camera that detects a focus state.

2. Description of the Related Art

Conventionally, there is a camera that has a photographing mode which can automatically and collectively set optimal photographing operations according to photographing environments. The camera of this type includes a portrait photographing mode best suited to human photographing, a landscape photographing mode best suited to landscape photographing, a night scene photographing mode best suited to night scene photographing, and the like, which all have names to enable easy recognition of respective photographing environments. Only by selecting a photographing mode suited to a photographing environment, a photographer can automatically and collectively set various predefined setting values such as a shutter speed value, a diaphragm value, and an exposure correction value.

In the camera having such photographing modes, the photographer can set various setting values according to a photographing environment without any expertise.

However, setting values that can be collectively set by selecting the photographing mode are various setting values employed to achieve a "generally" suited photographing operation. Consequently, an optimal photographing operation is not always achieved concerning "more specific" photographing of the selected photographing mode.

Thus, in a camera discussed in Japanese Patent Application Laid-Open No. 2004-184432, which automatically and collectively sets photographing operations by selecting a photographing mode according to a photographing environment, setting of focus driving concerning a focus adjustment operation in the photographing mode is also switched. This enables improvement of operability so that an optimal photographing operation can be carried out during "more specific" photographing of the selected photographing mode especially for the focus driving.

However, in the camera discussed in Japanese Patent Application Laid-Open No. 2004-184432, which has a focus detection operation suited to photographing of a moving object, there is no operation mode of automatically and collectively setting optimal focus detection operations according to the movement of the object.

Conventionally, there is a camera that can set a focus detection operation when the object becomes out of focus due to entry of obstacles or movement into the background. Such a camera can change the focus detection operation to continue focusing as long as possible on the target object even when the target object becomes out of focus. Conversely, when the target object is changed, the camera can change the focus detection operation to immediately focus on the currently targeted object.

The change in setting of the focus detection operation according to the movement of the object to be photographed enables better focusing. However, such a change in the focus detection operation forces the photographer to acquire expertise and gain photographing experience. Consequently, the photographer finds it difficult to know how to set in a scene to be photographed. An inexperienced user who has no knowledge on specific setting cannot use the camera. The photographer changes the setting according to his/her own photographing style or a photographing scene. However, optimal setting cannot always be set.

SUMMARY OF THE INVENTION

The present invention is directed to an imaging apparatus that enables a photographer to set an optimal focus detection operation to focus following movement of an object to be photographed by selecting an autofocus operation mode without being forced to gain photographing experience.

According to an aspect of the present invention, a control apparatus for controlling an imaging apparatus that includes a focus detection unit configured to detect a focus state of an image forming optical system includes a selection unit configured to select an autofocus operation mode in which setting values of a plurality of setting items are different from one another to control an operation of the focus detection unit according to a movement of an object, a storage unit configured to store setting values of the setting items corresponding to the operation mode, a setting unit configured to read setting values corresponding to the selected operation mode from the storage unit and set setting values of the plurality of setting items to initial setting values, and a setting value changing unit configured to change setting values of the setting items set by the setting unit and store the changed setting values in the storage unit, wherein an operation of the focus detection unit is controlled by the operation mode in which the setting values have been changed by the setting value changing unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a block diagram illustrating a configuration of a camera that is an imaging apparatus according to an exemplary embodiment of the present invention.

DESCRIPTION OF THE EMBODIMENTS

Figure 2A:
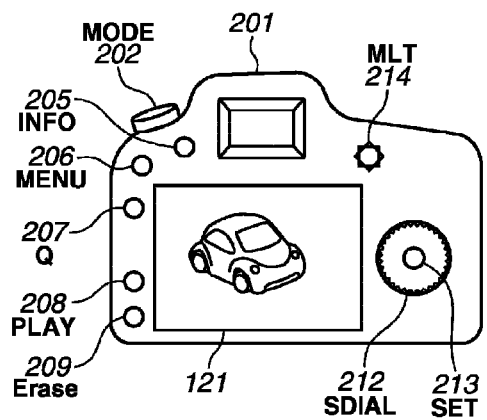
FIGS. 2A and 2B illustrate appearances of the camera according to the exemplary embodiment.

Various exemplary embodiments, features, and aspects of the invention will be described in detail below with reference to the drawings.

FIG. 1 is a block diagram illustrating a camera that is an imaging apparatus according to an exemplary embodiment of the present invention. As illustrated, the camera includes a photographic lens 101 that is an image forming optical system, and an image sensor 107 such as a charge coupled device (CCD) or a complementary metal-oxide semiconductor (CMOS) sensor configured to receive object light passed through the photographic lens 101 and execute photoelectric conversion to output image signal data. An image signal output from the image sensor 107 enters an analog signal processing circuit 109. Then, an audio-to-digital (A/D) converter 110 converts the analog signal into a digital signal.

In FIG. 1, a main mirror 102 having a semi-transparent part is inserted into a photographing light flux (mirror-down state). The main mirror 102 retreats out of the photographing light flux during photographing, and is set obliquely in a photographic optical path during focus detection. In the obliquely set state in the photographic optical path, the main mirror 102 guides a part of the light flux passed through the photographic lens 101 to an optical viewfinder that includes a focus plate 103, a pentagonal prism 104, and an eyepiece lens 105.

A sub-mirror 106 is configured to be folded or spread with respect to the main mirror 102 in synchronization with an operation of the main mirror 102. A part of the light flux passed through the semi-transparent part of the main mirror 102 is reflected downward by the sub-mirror 106, and enters an autofocus (AF) sensor 108. Then, a focus state of the photographic lens 101 is detected by a phase difference method. The AF sensor 108 can execute focus detection at positions corresponding to a plurality of AF frames. A system controller 112 includes a central processing unit (CPU) for controlling the camera overall and a random access memory (RAM) that is a storage device, and appropriately controls operations of the respective units described below. The system controller 112 constitutes, together with the AF sensor 108, a focus detection unit configured to detect the focus state of the photographic lens 101.

A lens driving unit 113, which is connected to the system controller 112, includes a communication circuit configured to communicate with the photographic lens 101, a lens driving mechanism for driving the lens to adjust a focus, and its driving circuit. A mirror driving unit 114, which is connected to the system controller 112, drives the main mirror 102 out of the photographing light flux. A sensor control unit 115, which is connected to the system controller 112, controls the AF sensor 108. An image sensor driving unit 116, which is connected to the system controller 112, drives the image sensor 107.

A digital signal processing circuit 111, which is connected to the system controller 112, executes image processing such as shading correction or gamma correction for the signal converted into the digital signal by the A/D converter 110.

A buffer memory 117, which is connected to the digital signal processing circuit 111, can store image signal data of a plurality of frames captured by the image sensor 107. The A/D converted signal is first stored in the buffer memory 117. The digital signal processing circuit 111 reads the image signal data stored in the buffer memory 117 to execute each processing described above, and stores the processed image signal data again in the buffer memory 117.

A recording/reproducing signal processing circuit 118 records the image signal data in a recording medium 119 such as a memory card. The recording/reproducing signal processing circuit 118 is connected to the digital signal processing circuit 111. The image signal data subjected to various processes by the digital signal processing circuit 111 is compressed by, for example, a Joint Photographic Experts Group (JPEG) format when the image signal data, which is once stored in the buffer memory 117, is recorded in the recording medium 119. On the other hand, when the image signal data is read from the recording medium 119, the recording/reproducing signal processing circuit 118 decompresses the image signal data. The recording/reproducing signal processing circuit 118 includes an interface for communicating data with the recording medium 119.

A display apparatus 121, which is a display unit for displaying a captured image, is also used for reproducing and displaying the image signal data recorded in the recording medium 119. When an image is displayed by the display apparatus 121, the image signal data stored in the buffer memory 117 is read, and the digital image signal is converted into an analog image signal by a digital-to-analog (D/A) converter 120. Then, the image is displayed by the display apparatus 121 with use of the analog image signal.

There are two forms of displaying the images captured by the image sensor 107 on the display apparatus 121. One is a display form when no release operation is carried out. This display form is referred to as a live view where images repeatedly captured by the image sensor 107 are sequentially updated and displayed. The other is a display form referred to as a freeze image where after the release operation of the camera, the images captured by the image sensor 107 are displayed for a predetermined time.

An operation unit 122, which is connected to the system controller 112, includes operation members for operating the camera, such as a power switch for turning on and off the power to the camera, a release button, and a setting button for selecting a photographing mode such as a human photographing mode. When such a switch or a button is operated, a signal corresponding to the operation is input to the system controller 112.

There are connected to the release button a switch SW1 turned on by a first stroke operation (half pressing) of the release button operated by the photographer and a switch SW2 turned on by a second stroke operation (full pressing) of the release button. Focus adjustment modes include an arbitrary selection mode, an area enlargement mode, and an automatic selection mode, which can be appropriately set by a photographer's operation.

Figure 2B:
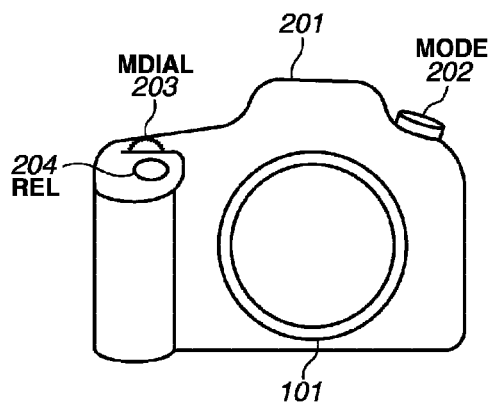

FIGS. 2A and 2B illustrate appearances of the camera (imaging apparatus) according to the present exemplary embodiment. FIG. 2A is a rear view of the camera, and FIG. 2B is a front view of the camera. The operation members of the camera are descried referring to FIGS. 2A and 2B.

Referring to FIG. 2B, the operation members arranged on the front of the camera are described. A camera body 201 includes a release button 204, a main electronic dial 203, and a photographing mode dial 202. The photographic lens 101 is detachable from the camera body 201. In the drawing, the release button 204, the main electronic dial 203, and the photographing mode dial 202 are respectively represented by [REL], [MDIAL], and [MODE].

The release button 204 is a two-state pressing switch. When the photographer half-presses the release button, the switch SW1 of the first stage (first switch) is turned on. When the switch SW1 is turned on, an autofocus (AF) operation or a photometric operation that is a photographing preparation operation of the camera is started. When the photographer further presses the release button 104 (full pressing), the switch SW2 of the second stage (second switch) is turned on. When the switch SW2 is turned on, a photographing operation of the camera is executed.

The photographing mode dial 202 is a dial type switch. The photographing mode dial 202 enables setting of a photographing mode of the camera.

The main electronic dial 203 is a multifunction signal input member configured to input numerical values to the camera or switch various operation modes together with the other operation members.

Next, referring to FIG. 2A, the operation members arranged on the rear surface of the camera are described. There are arranged on the rear surface of the camera button switches, such as an information button 205, a menu button 206, a queue button 207, a play button 208, and an erase button 209. There are also arranged input switches including a sub-electronic dial 212, a set button 213, and an eight-direction input switch 214, and the display apparatus 121. In the drawing, the information button 205, the menu button 206, the queue button 207, the play button 208, the erase button 209, the sub-electronic dial 212, the set button 213, and the eight-direction input switch 214 are respectively represented by [INFO], [MENU], [Q], [PLAY], [Erase], [SDIAL], [SET], and [MLT].

The sub-electronic dial 212 is a multifunction signal input member configured to input numerical values to the camera or switch various operation modes together with the other operation members. The set button 231 is used for determining a setting value.

The eight-direction input switch 214 is used for moving an index (focus display or tub selection display) on a screen in eight directions, namely, up, down, left, right, and oblique directions. Movable directions are individually determined on the screen. The eight-direction input switch 214 is also used for selecting an AF frame.

The display apparatus 121 is an image display unit mounted on the rear surface of the camera body 201. The display apparatus 121 can display a live view image, various setting menus, and a photometric value and an operation state of the camera.

The information button 205 is a switch for switching contents displayed on the display apparatus 121. When the information button 205 is pressed on the menu screen, instructions can be displayed while the button is being pressed.

The menu button 206 is used for displaying the menu screen to set the camera in various states. On the menu screen, a list of setting items is displayed. When a setting item is selected by the sub-electronic dial 212, and the set button 213 is pressed based on the desired setting item, the setting screen of the setting item appears. The setting items and the setting values can also be selected using the main electronic dial 203 and the eight-direction input switch 214. A method for setting an AF operation mode on the menu screen is described below.

When the queue button 207 is turned on on the menu screen, the screen is switched to a screen for setting relevant items in detail. Such detailed items can be set on the screen. When the play button 208 is turned on, the camera is set in a reproduction mode, and the image signal data recorded in the recording medium 119 is displayed on the display apparatus 121. When the erase button 209 is turned on in this case, the displayed image data can be erased from the recording medium 119. When the erase button 209 is turned on on the detailed setting screen of the menu screen, a content of the detailed setting can be returned to an initial setting value.

Figure 4A:
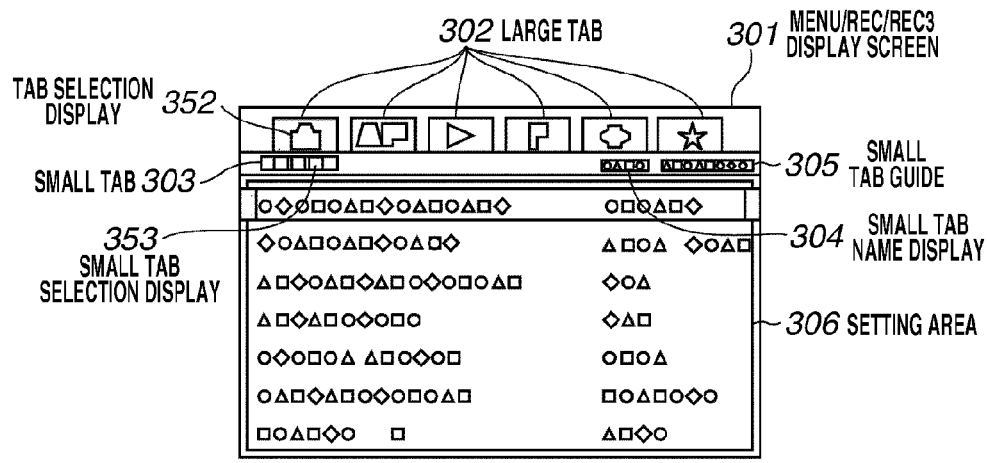
FIGS. 4A and 4B illustrate a menu display screen and a servo setting screen.

Next, referring to FIG. 4A, the menu screen displayed when the menu button 206 is turned on is described. Large tubs 302 are tub display for classifying large items of the menu. The large tubs include a "photograph" tub, an "AF" tub, a "play" tub, a "set" tub, a "custom function" tub, and a "my menu" tub, where icons representing respective functions are displayed. Black coloring of a tub ground (tub selection display 352) indicates that this tub has been selected. FIG. 4A illustrates an example where the "photograph" tub ("REC" in the drawing) is selected.

The large tub 302 is divided into a plurality of small tubs 303. A content of one small tub can be displayed on one screen. Square marks are displayed corresponding to the number of small tubs 303. A selected small tub is displayed by a black square (small tub selection display 353). FIG. 4A illustrates an example where the small tube 303 is "REC 3".

On a small tub name display 304, a name of the selected small tub 303 is displayed. Adjacent to the small tub name display 304, a simple guide of the small tub 303 is displayed (small tub guide 305). A setting item and a setting value of the selected small tub 303 are displayed in a setting area 306. The small tub guide 305 can be omitted.

The small tubs 303 can be selected by operating the main electronic dial 203 on the menu screen. When the dial is rotated to the right by one click, one right small tub 303 is selected. When the dial is further rotated to the right from a small tub 303 at the right end, a small tub 303 at the left end of a next (right) large tub 302 is selected. When the main electronic dial 203 is rotated to the left, a left small tub 303 is selected. When the dial is further rotated to the left from a small tub 303 at the left end, a small tub 303 at the right end of one previous (left) large tub 302 is selected. An operation of the eight-direction input switch 214 in the horizontal direction enables similar selection.

Each setting item displayed in the setting area 306 is selected by the sub-electronic dial 212. The setting items can also be selected by an operation of the eight-direction input switch 214 in the vertical direction.

The selection method of the large tubs 302, the small tubs 303, and the setting items is not limited to the above described examples. Only the large tubs 302 can be directly selected by the eight-direction input switch 214 or the other operation members can be used in an auxiliary manner.

Figure 4B:
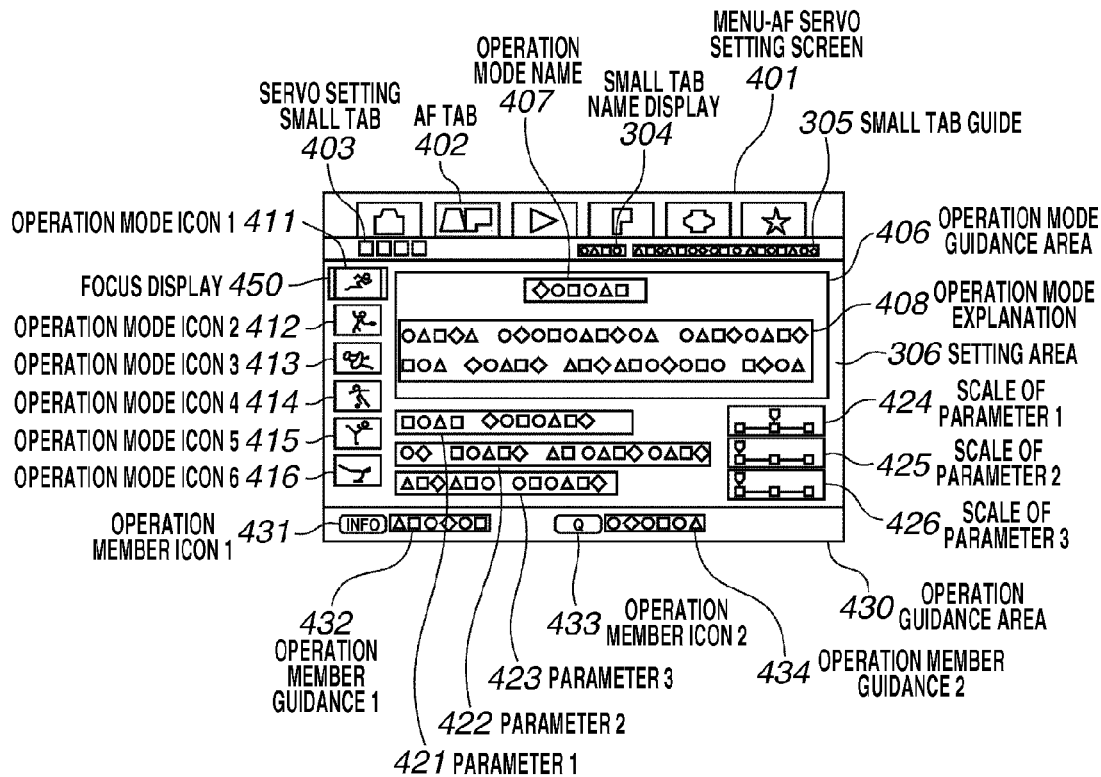

Referring to FIG. 4B, a setting screen (servo setting screen 401) of the operation modes according to the exemplary embodiment of the present invention is described. The servo setting screen 401, which is one of the menu screens, is classified as a first (left end) small tub of the large tub classification "AF" tub. In FIG. 4B, an AF tub 402 is selected, and a first small tub is displayed with a black square (servo setting small tube 403). The small tub name display 304 and the small tub guide 305 are displayed as "AF 1" and "servo setting" respectively, thus this screen can be understood to be "servo setting".

At the left end of the setting area 306 of the servo setting screen, operation mode icons 411 to 416 are vertically arrayed. The operation modes of the respective icons are described below. A selected operation mode icon is indicated by a black frame (focus display 450).

The vertical operation of the sub-electronic dial 212 or the eight-direction input switch 214 enables selection of the operation modes. The focus display 405 is moved to the selected operation mode.

An operation mode guidance area 406 is located on the right side of the operation mode icons 411 to 416 above the setting area 306. An operation mode name 407 and an operation mode explanation 408 are displayed in the operation mode guidance area 406. In the operation mode name 407, a name of the selected operation mode (operation mode corresponding to the icon displayed in the focus display) is displayed. Brief explanation of the operation mode is displayed in the operation mode explanation 408. Contents of the operation mode explanation of the respective operation modes are described below.

In a lower part of the setting area 306 (below the operation mode guidance area 406), a plurality of parameters 421, 422, and 423 and parameter scales 424, 425, and 426 are displayed.

Figure 7A:
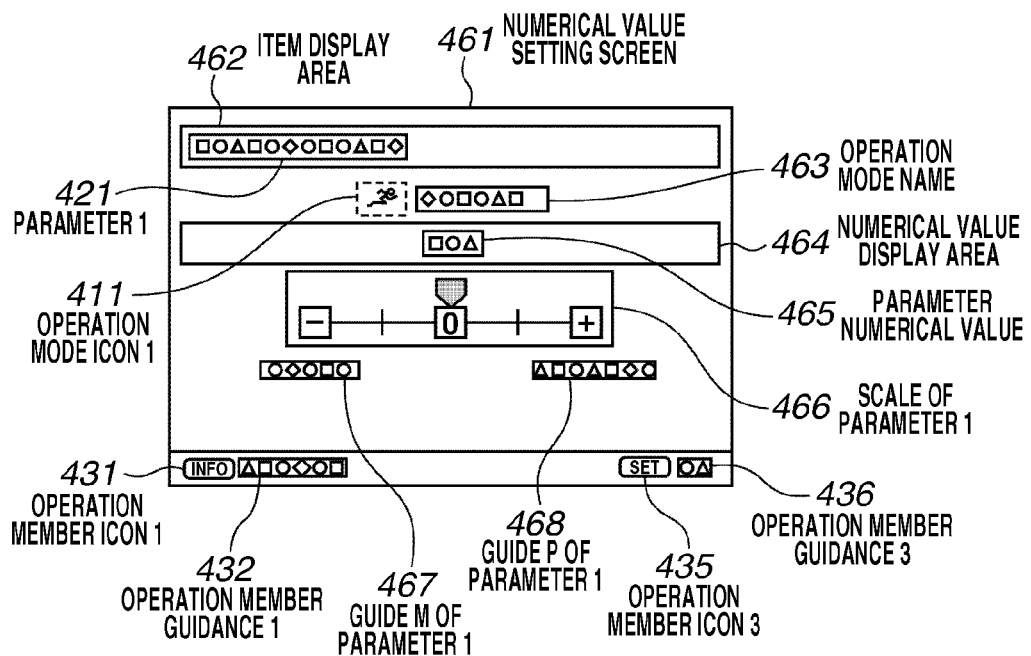
FIGS. 7A and 7B illustrate a numerical value setting screen.
Figure 7B:
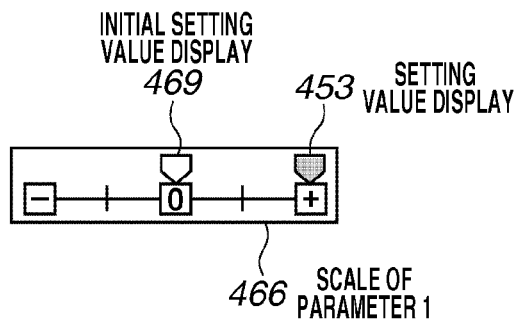

The parameter 1 (421) concerning "object following characteristics" is a setting item for setting supplemental characteristics when the AF frame moves out of the object during focus detection by the servo AF. When the parameter 1 is set to a plus side, a setting that enables the camera to be easily focused on an object newly captured by the AF frame and is suited when the camera is quickly focused on the object that has come within the AF frame to sequentially capture images is achieved. Reaction to another object is faster with the setting of +2 than the setting of +1. Conversely, when the parameter 1 is set to a minus side, even when the AF frame moves out of the object for a moment, a setting where the camera is continued focused on the target object is achieved. The target object is captured longer with the setting of −2 than the setting of −1. The "object following characteristics" have two-stage adjustment widths where standard setting is 0, a "quick" side is set to a plus side, and "holding-out" side is set to a minus side. The setting values can be set to plus and minus, where the scale of the parameter 1 is displayed by scales and indexes of a horizontal axis of ±2 at the center of 0 as illustrated in FIG. 7B.

Figure 8A:
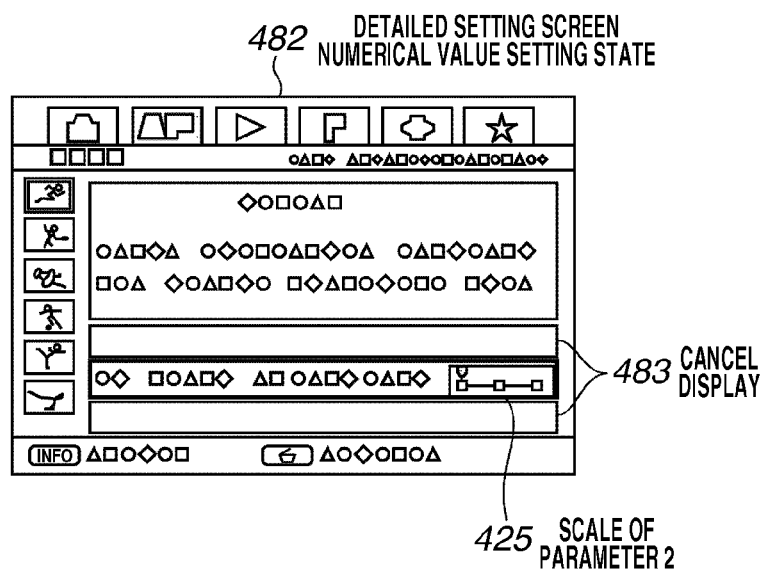
FIGS. 8A and 8B illustrate a numerical value setting state of the detailed setting screen.
Figure 8B:
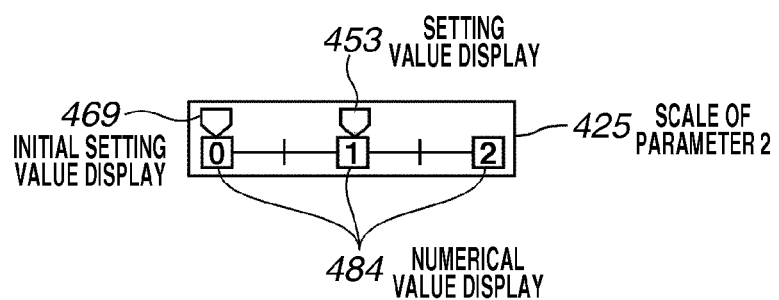

The parameter 2 (422) concerning "following characteristics with respect to speed change" is a parameter (setting item) for changing the operation of the servo AF with respect to a speed change such as acceleration, deceleration, or a stop of the object. With the setting of 0, a focus is stabilized on an object of no sudden acceleration/deceleration. The setting of +1 or +2 is suited to an object that suddenly accelerates, decelerates, or stops. For an object with little speed change, the setting of +1 or +2 may cause a focus to be unstable, and hence an appropriate setting is necessary with respect to the speed change of the object. The camera can follow a greater speed change with the setting of +2 than the setting of +1. The "following characteristics with respect to speed change" concern acceleration or deceleration. Thus, the setting values are not set to minus but set at three stages of 0, +1, and +2. The scale of the parameter 2 is displayed by scales and indexes of a horizontal axis of 0 to 2 as illustrated in FIG. 8B, and only plus setting is permitted.

The parameter 3 (423) concerning "AF frame switching characteristics" is a setting item that functions when a plurality of AF frames are automatically selected to be used. When a vertically or horizontally moving object is photographed, characteristics to automatically select the AF frames can be changed. At standard setting of 0, AF frame switching is slow. At settings of +1 and +2, an AF frame for focus detection moves in reaction to a slight focus change. AF frame switching is smoother with the setting of +2 than the setting of +1. In the case of setting of +1 or +2, AF frame switching may be too smooth. It is therefore important to execute setting according to the object.

The "AF frame switching characteristics" is a parameter for AF frame switching easiness. Thus, the setting value is not set to minus but set at three stages of 0, +1, and +2. The scale 426 of the parameter 3 is similar to that illustrated in FIG. 8B.

An operation guidance area 430 is located in a lowest part of the setting area 306. An icon of an operation member to be used and its guidance are displayed in this area. On the servo setting screen 401, an icon 431 (operation member icon 1) and an operation member guidance 432 (operation member guidance 1) of the information button 205, and an icon 433 (operation member icon 2) and an operation member guidance 434 (operation member guidance 2) of the queue button 207 are displayed.

The operation member guidance 1 (432) is displayed as "help", indicating that help display is executed by operating the information button 205. The operation member guidance 2 (434) is displayed as "detailed setting", indicating that the screen is changed to the one for executing detailed setting by the queue button 207.

Next, the individual operation modes and the respective parameters are described.

When the operation mode icon 411 is selected, the operation mode name 407 is displayed as "case 1", and the operation mode explanation 408 is displayed as "highly versatile basic setting". Initial setting values of the parameters are respectively "object following characteristics": 0, "following characteristics with respect to speed change": 0, and "AF frame switching characteristics": 0. The initial setting values are stored in the RAM of the system controller 112. The "case 1" is highly versatile setting capable of dealing with many photographing scenes and objects.

When the operation mode icon 412 is selected, the operation mode name 407 is displayed as "case 2", and the operation mode explanation 408 is displayed as "for a scene where object easily moves out of AF frame due to obstacles and active movements". Initial setting values of the parameters are respectively "object following characteristics": −1, "following characteristics with respect to speed change": 0, and "AF frame switching characteristics": 0.

The "case 2" is setting to continue focusing on the object even when the target object moves out of the AF frame for a moment. This setting is effective for a scene where an obstacle comes before the object for a moment or the object actively moves to be out of the AF frame. When the object is out of the AF frame for a long time, it is more effective to set "object following characteristics" to −2. Specific photographing scenes are a swimming butterfly stroke, free style skiing, and tennis.

When the operation mode icon 413 is selected, the operation mode name 407 is displayed as "case 3", and the operation mode explanation 408 is displayed as "for a scene where focus is quickly set on object coming into AF frame". Initial setting values of the parameters are respectively "object following characteristics": +1, "following characteristics with respect to speed change": 0, and "AF frame switching characteristics": 0.

The "case 3" is setting to quickly focus on another object when the object is captured during the servo AF. This setting is effective for a scene where focus is quickly set on the object captured within the AF frame or different objects are sequentially photographed. When "object following characteristics" is set to +2, setting for start focusing more quickly is achieved. A specific photographing scene is starting of Alpine downhill skiing or bicycle road race.

When the operation mode icon 414 is selected, the operation mode name 407 is displayed as "case 4", and the operation mode explanation 408 is displayed as "for scene where speed change of object is large". Initial setting values of the parameters are respectively "object following characteristics": 0, "following characteristics with respect to speed change": +1, and "AF frame switching characteristics": 0.

The "case 4" is setting to focus on the object following a speed change even when the moving speed of the object instantaneously changes greatly. This setting is effective for a scene where the object suddenly moves, accelerates, decelerates, or stops. In the case of an object with little speed change, focusing may become unstable. When the AF cannot follow the speed change, it is more effective to set "following characteristics with respect to speed change" to +2. Specific photographing scenes are motor sports and soccer.

When the operation mode icon 415 is selected, the operation mode name 407 is displayed as "case 5", and the operation mode explanation 408 is displayed as "for a scene where vertical and horizontal movement of object is large". Initial setting values of the parameters are respectively "object following characteristics": 0, "following characteristics with respect to speed change": 0, and "AF frame switching characteristics": +1.

The "case 5" functions when a plurality of AF frames are automatically selected. This is setting to continue focusing while automatically switching to an AF frame which can easily detect a focus when the vertical and horizontal movement of the target object is large and focusing is accordingly difficult. To actively execute AF frame switching, "AF frame switching characteristics" are set to +2. Photographing scene examples are figure skating and air racing.

When the operation mode icon 416 is selected, the operation mode name 407 is displayed as "case 6", and the operation mode explanation 408 is displayed as "for scene where speed change and vertical and horizontal movement of object are large". Initial setting values of the parameters are respectively "object following characteristics": 0, "following characteristics with respect to speed change": +1, and "AF frame switching characteristics": +1.

The "case 6" functions when AF frames are automatically selected. This is setting to continue focusing on the object by following a speed change thereof even when the movement speed of the object instantaneously changes greatly. When the vertical and horizontal movement of the target object is large and focusing is accordingly difficult, focusing is continued while switching to an AF frame where automatic focus detection is easy.

When the AF cannot follow the speed change, it may be more effective to set "following characteristics with respect to speed change" to +2. To actively execute AF frame switching, "AF frame switching characteristics" are set to +2. Specific photographing scenes are basketball and rhythmic gymnastics.

As described above, since the operation mode name 407 and the operation mode explanation 408 are displayed in the operation mode guidance area 406, a user can accurately select the operation mode. The selection of the operation mode enables the user to perform setting suited to photographing collectively without much knowledge about the effects of the parameters 1 to 3.

Hereinafter, referring to FIG. 3, a setting of the operation mode according to the exemplary embodiment of the present invention is described. The setting of the operation mode is started from step S300. In step S301, when a user operates the operation unit 122, the servo setting screen 401 illustrated in FIG. 4B that is an operation mode selection screen is displayed on the display apparatus. More specifically, the user turns on the menu button 206 and operates the main electronic dial 203 (or horizontally operates the eight-direction input switch 214) to select the AF tub 402 and the servo setting small tub 403.

When the sub-electronic dial 212 is operated on the servo setting screen 401, the position of the focus display 450 changes to select another operation mode. The sub-electronic dial 212 and the system controller 112 constitute an operation mode selection unit. After the selection of another operation mode, in step S302, the operation mode guidance area 406 and the displaying of each parameter scale are changed according to the selected operation mode. Then, the selected operation mode is stored, and the processing proceeds to step S303.

In step S303, it is determined whether the information button 205 is pressed. When it is determined that the information button 205 is pressed (ON in step S303), in step S304, a help screen concerning the selected operation mode is displayed.

Figure 5A:
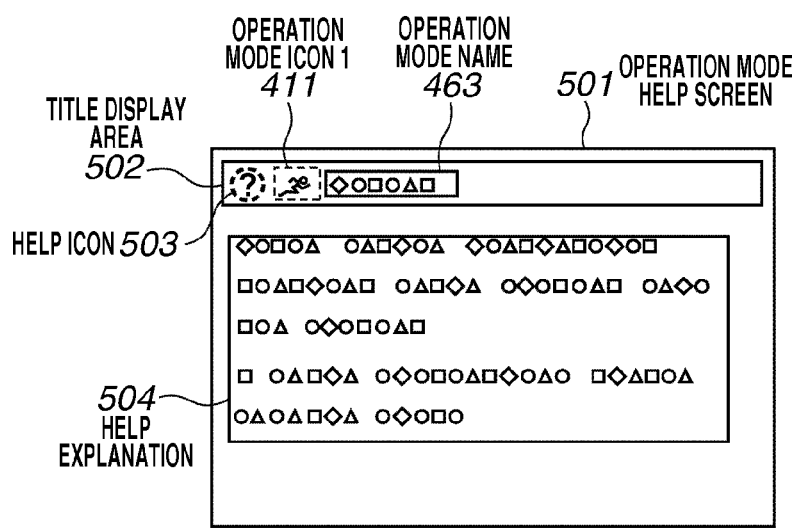
FIGS. 5A and 5B illustrate help screens.

Referring to FIG. 5A, an operation mode help screen 501 is described. A top row of the operation mode help screen 501 is a title display area 502. In this area, from the left side, a help icon 503 indicating the help screen, an operation mode icon 1 (411), and an operation mode name 463 are displayed. When the operation mode icon 1 has been selected, the "case 1" is displayed in the operation mode name 463. A help explanation 504 is displayed below the title display area 502. In this area, contents of the operation mode explanation 408 are displayed. The help explanation 504 describes contents more specific than that of the operation mode explanation 408 displayed in the operation mode guidance area 406. A scene suited to the operation mode, an operation of each parameter, and a method for effectively changing its value are described. Since a specific photographing scene example is described, the user can select an optimal operation mode.

Figure 3:
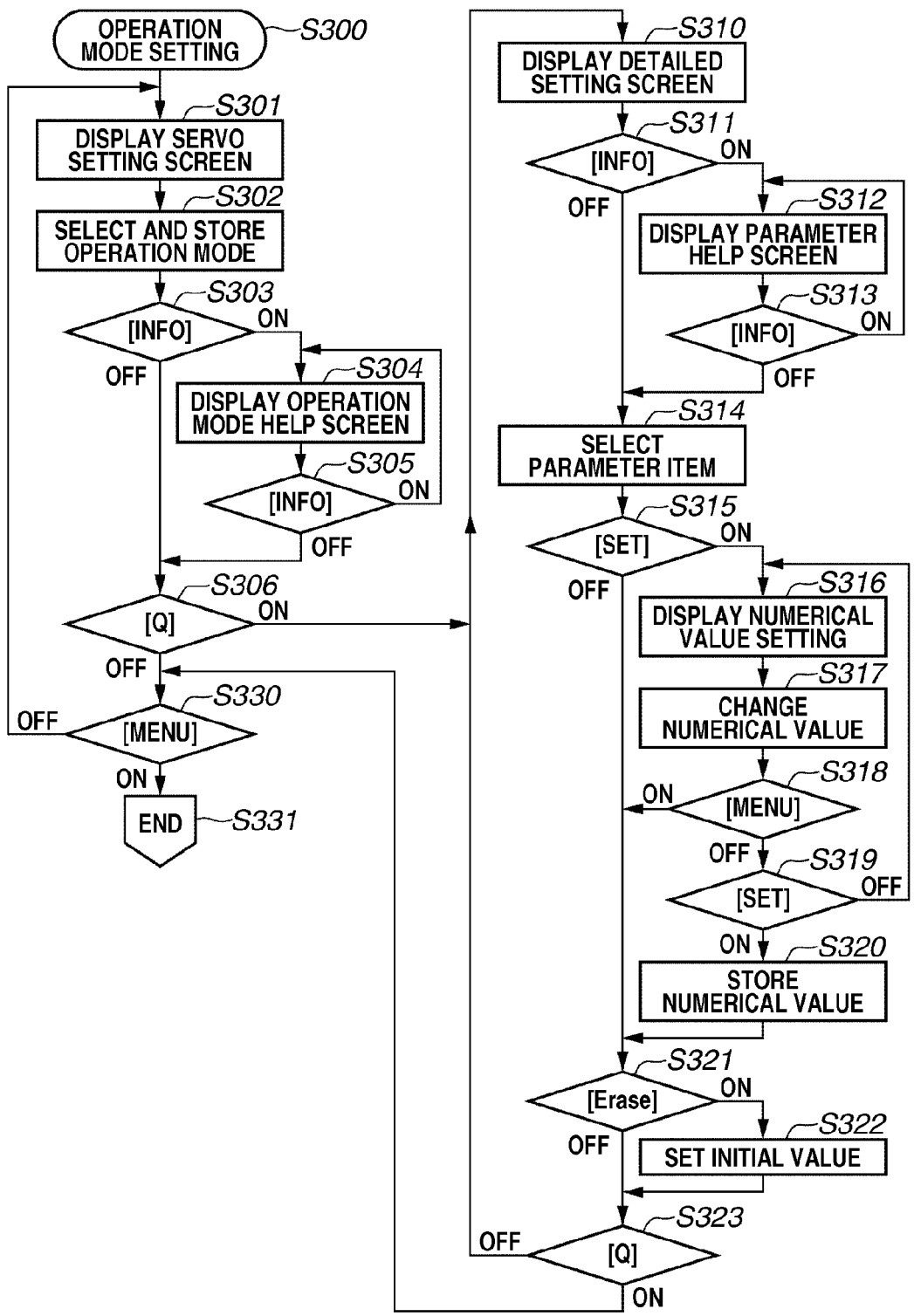
FIG. 3 is a flowchart illustrating an operation of the camera according to the exemplary embodiment.

Referring back to the flowchart in FIG. 3, in step S305, it is determined whether the information button 205 is on. While the information button 205 is on (ON in step S305), the processing loops through step S305 and S304 to continue displaying of the operation mode help screen 501.

When the information button 205 is off (OFF in step S305), the help screen is changed to the servo setting screen 401, and the processing proceeds to step S306. In step S306, whether the queue button 207 is on is determined. When the queue button 207 is on (ON in step S306), the processing proceeds to step S310 to execute detailed parameter setting. When the queue button 207 is off (OFF in step S306), the processing proceeds to step S330.

In step S330, a state of the menu button 206 is determined. When the menu button 206 is off (OFF in step S330), the processing returns to step S301 to repeat the processing of the servo setting screen. When the menu button 206 is on (ON in step S330), in step S331, the setting operation on the servo setting menu (i.e., menu screen) is ended.

Figure 9:
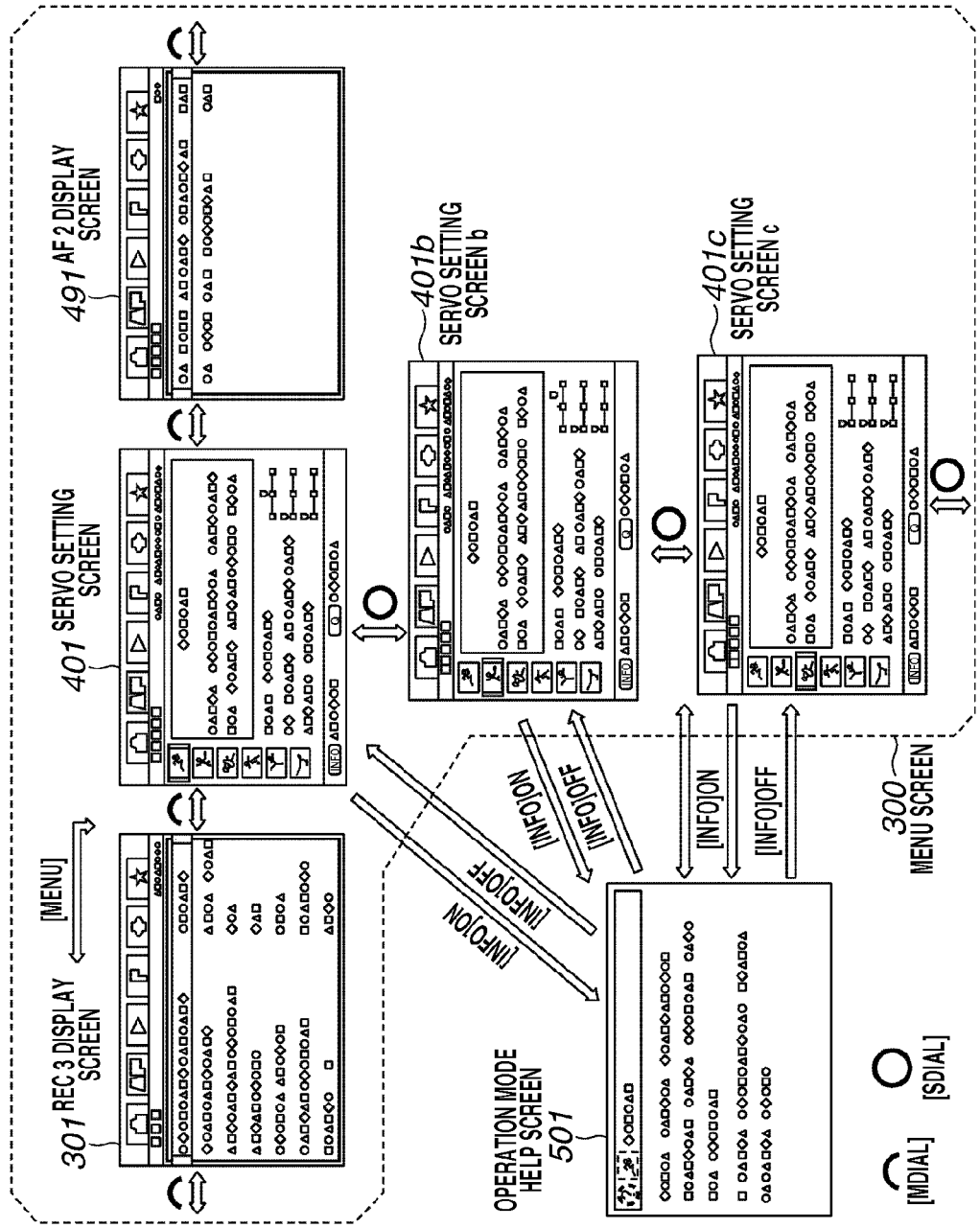
FIG. 9 illustrates a state change from the servo setting screen.

FIG. 9 is a state transition diagram illustrating the operations in steps S300 to S306 and steps S330 and S331. When a user turns on the menu button 206, the processing enters a menu screen 300 (entire menu screen) in a dotted line. When the user turns on the menu button 206 again, the processing moves out of the menu screen 300. In the menu screen 300, tubs are selected by the main electronic dial 203 (e.g., ↔ screen 301 ↔ screen 401 ↔ screen 491 ↔ ).

On the other hand, items displayed on the menu screen are selected by the sub-electronic dial 212. A servo operation mode is selected on the servo setting screen (screen 401 ↔ screen 401b ↔ screen 401c ↔ ). The main electronic dial 203 and the sub-electronic dial 212 can be operated by horizontally and vertically operating the eight-direction input switch 214.

On the servo setting screen 401, the operation mode help screen 501 is displayed for the selected operation mode while the user presses the information button 205. When the user releases the information button 205, the processing returns to the original screen.

Referring back to the flowchart in FIG. 3, in step S306, when the queue button 207 is on (ON in step S306), the processing proceeds to step S310. In this step, the servo setting screen 401 is changed to a detailed setting screen 471.

Figure 6:
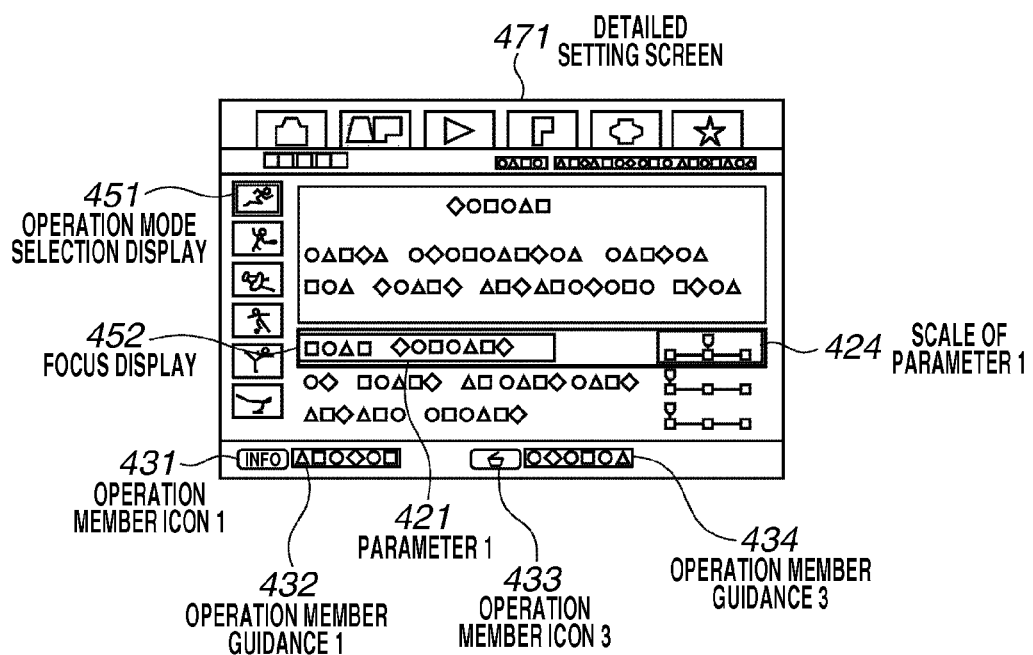
FIG. 6 illustrates a detailed setting screen.

Referring to FIG. 6, the detailed setting screen 471 is described. On the detailed setting screen 471, a focus display 452 moves to a frame surrounding both of the parameter 1 (421) and the parameter 1 scale 424.

The selected operation mode icon is displayed in an operation mode selection display 451. Further, contents displayed in the operation guidance area 430 in the lower part of the screen is changed. The icon and the guidance display of the queue button 207 are cleared and changed to an icon 433 (operation member icon 3) and an operation member guidance 3 (434) of the erase button 209. The operation member guidance 3 is "initial setting". When the erase button 209 is turned on on the detailed setting screen 471, the parameter 1 "object following characteristics", the parameter 2 "following characteristics with respect to speed change", and the parameter 3 "AF frame switching characteristics" return to the initial setting values of the selected operation mode. Thus, the initial setting values can be collectively restored, for example, when a setting value change causes operations different from those the user intended. The erase button 209 and the system controller 112 constitute an initial setting value restoration unit.

Referring back to the flowchart in FIG. 3, in step S311, whether the information button 205 is pressed is determined. If it is determined that the information button 205 is pressed (ON in step S311), then in step S312, a help screen is displayed for the selected parameter item.

Figure 5B:
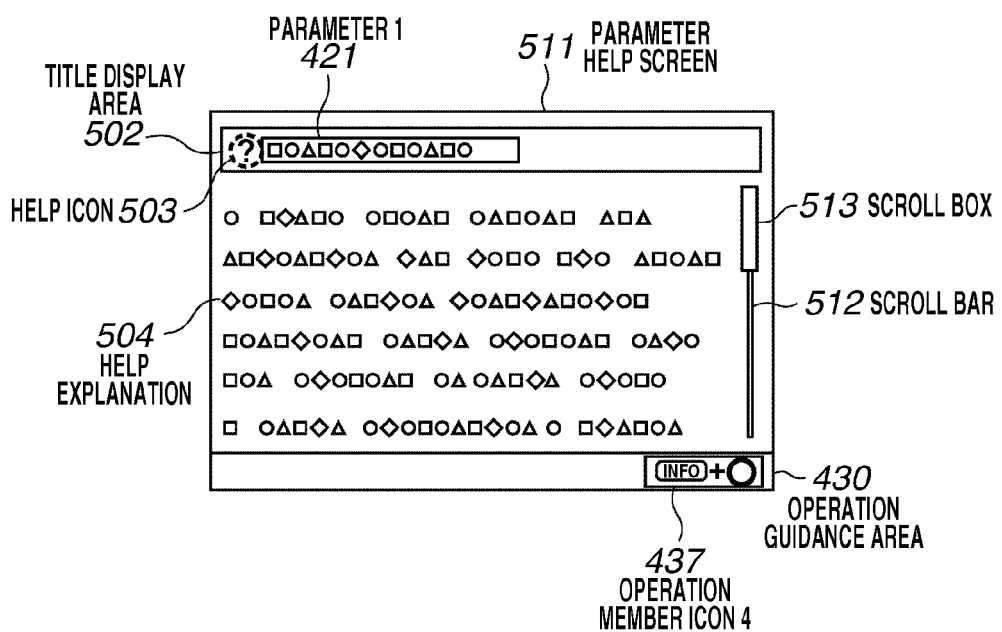

Referring to FIG. 5B, a parameter help screen 511 is described. On the parameter help screen 511, explanation of the selected parameter item is displayed. Atop row is a title display area 502. In the title display area, from the left, a help icon 503 indicating a help screen and a parameter name are displayed (when parameter 1 is selected, "object following characteristics" is displayed). Help explanation 504 for the selected parameter is displayed below the title display area 502. When the help explanation 504 does not fall within the screen, a scroll box 513 and a scroll bar 512 are displayed on the right side, indicating that there is a next screen. Scrolling is executed by operating the sub-electronic dial 212 while the information button 205 is on. This scrolling operation is guided by displaying an operation member icon 4 (437) indicating a simultaneous operation of the information button 205 and the sub-electronic dial 212 in the operation guidance area 340 of the lower side.

Through the help explanation 504 of the parameter item, the effect of the parameter and how the setting value should be changed to achieve a desired operation can be known. A specific content is similar to that of the above explanation of each parameter.

Referring back to the flowchart in FIG. 3, after the displaying of the parameter help screen 511, the processing proceeds to step S313 to determine whether the information button 205 is on. The displaying of the parameter help screen 511 is continued by the processing loops through steps S312 and S313 while the information button 205 is on (ON in step S313). When the information button 205 is off (OFF in step S313), the displaying is changed from the parameter help screen 511 to the detailed setting screen 471, and then the processing proceeds to step S314.

In step S314, the user operates the sub-electronic dial 212 to select a parameter to be changed in setting. More specifically, one of the parameter 1 (421) "object following characteristics", the parameter 2 (422) "following characteristics with respect to speed change", and the parameter 3 (423) "AF frame switching characteristics" is selected.

After the parameter to be changed in setting is selected, in step S315, a state of the set button 213 is determined. When the set button 213 is on (ON in step S315), the processing proceeds to step S316. Whereas it is off (OFF in step S315), the processing proceeds to step S321.

In step S316, a screen for setting a numerical value of the selected parameter is displayed. When the selected parameter is "object following characteristics", a numerical value setting screen 461 illustrated in FIG. 7A is displayed to set a parameter numerical value. When the parameter is "following characteristics with respect to speed change" or "AF frame switching characteristics", a part of the displaying of the detailed setting screen is changed to set a parameter numerical value as illustrated in FIG. 8A.

Referring to FIG. 7A, the numerical value setting screen 461 is described. There is an item display area 462 in the upper part of the screen. In the case of the numerical value setting screen of the parameter 1, "object following characteristics" are displayed. Below the item display area 462, a current operation mode icon and an operation mode name are displayed (in the illustrated example, an operation mode icon 1 (411) and an operation mode name "case 1" 463). A numerical value display area 464 is located below to display a numerical value 465 of the parameter 1. Further below, a scale 466 of the parameter 1 is displayed. The scale of "object following characteristics" is "−" at the left end, "0" at the center, and "+" at the right end. Since the parameter can be set within the range of ±2 at the center of 0, the scale indicating −1 and +1 can respectively be displayed between the left end and the center and between the center and the right end. An index of a setting value is displayed black (located at 0 in the drawing). "Holding-out" (a guide M 467 of parameter 1) and "quick" (guide P 468 of parameter 1) are respectively displayed on a minus side and a plus side of the numeral value and indicate specific operations.

An operation member guidance is displayed in the lowest part of the screen. The icon 431 and the operation member guidance 1 (432) of the information button 205 are as described above. In addition, an icon (435) of the set button 213 and its corresponding operation member guidance 3 (436) are displayed.

The operation member guidance 3 (436) is displayed as "OK", indicating that a value changed by operating the set button 213 is stored and this screen shifts to the original screen.

The setting value is changed by operating the sub-electronic dial 212 or horizontally operating the eight-direction input switch 214. When the operation is made, the display of the parameter numeral value 465 and the index on the scale 466 of the parameter 1 are immediately changed. At this point, however, no value is determined. In other words, no value is stored yet as a setting value of the parameter 1.

The index of the parameter numerical value currently being set is displayed black, and an initial setting value of the parameter in the operation mode is indicated by a white index. This enables the user to understand how much the parameter is changed from its initial setting value. The setting value can be returned to the initial setting value by changing the black index to the positron of the white index. FIG. 7B illustrates a case where the initial setting value is 0 and a value currently being set is +2.

FIG. 8A illustrates a numerical value setting state of the parameter 2 "following characteristics with respect to speed change". Parameters and parameter scales other than the parameter to be set are canceled (483) to make an item to be set easier to be recognized. FIG. 8B illustrates a scale 425 of the parameter 2 in detail. The parameter scale is displayed at "0" at the left end, "1" at the center, and "2" at the right end (484), indicating that parameters can be set at 0 to 2. An index of a parameter numerical value currently being set is displayed black, and an initial setting value is indicated by a white index. An index position can be changed by operating the sub-electronic dial 212 or horizontally operating the eight-direction input switch 214. The black index returns to a position of the initial setting value by operating the erase button 209.

The parameter numerical value is determined to be a numerical value of the index position by the set button 213. As described above, since each of the parameters can be changed from the values collectively set by the operation mode, the parameters can be adjusted according to individual photographing scenes.

Referring back to the flowchart in FIG. 3, in step S317, the setting value is changed by operating the sub-electronic dial 212 or horizontally operating the eight-direction input switch 214.

The changed numerical value is stored by turning the set button 213 on, but not stored when the menu button 206 is turned on. In step S318, if the menu button 206 is determined to be on (ON in step S318), the processing proceeds to step S321 without storing the changed numerical value. In other words, the numerical value change is canceled.

If the menu button 206 is off (OFF in step S318), then in step S319, a state of the set button 213 is determined. If the set button 213 is on (ON in step S319), the processing proceeds to step S320 to store the numerical value. Then, the processing proceeds to step S321. If the set button 213 is off (OFF in step S319), the processing returns to step S316 to loop through the processing of the numerical value change.

The RAM of the system controller 112 constitutes a setting value storage unit configured to store the initial setting value and the changed setting value. The sub-electronic dial 212 (or the eight-direction input switch 214), the set button 213, and the system controller 112 constitute a setting value changing unit.

The parameter numerical value changing screen returns to the detailed setting screen 471 when the set button 213 is turned on to determine (store) the changed numerical value or the menu button 206 is turned on to cancel the numerical value changing.

In step S321, a state of the erase button 209 is determined. When the erase button 209 is off (OFF in step S321), the processing proceeds to step S323. When the erase button 209 is on (ON in step S321), each parameter is returned to the initial setting value of the selected operation mode. For example, when the operation mode is "case 1", the parameters are respectively set to "object following characteristics": 0, "following characteristics with respect to speed change": 0, and "AF frame switching characteristics": 0. After the values return to the initial settings, the processing proceeds to step S323.

In step S323, a state of the queue button 207 is determined. When the queue button is off (OFF in step S323), the processing returns to step S310 to continue the processing of the detailed setting screen. When the queue button 207 is on (ON in step S323), the displaying is changed from the detailed setting screen to the servo setting screen, and then the processing returns to step S330.

Figure 10:
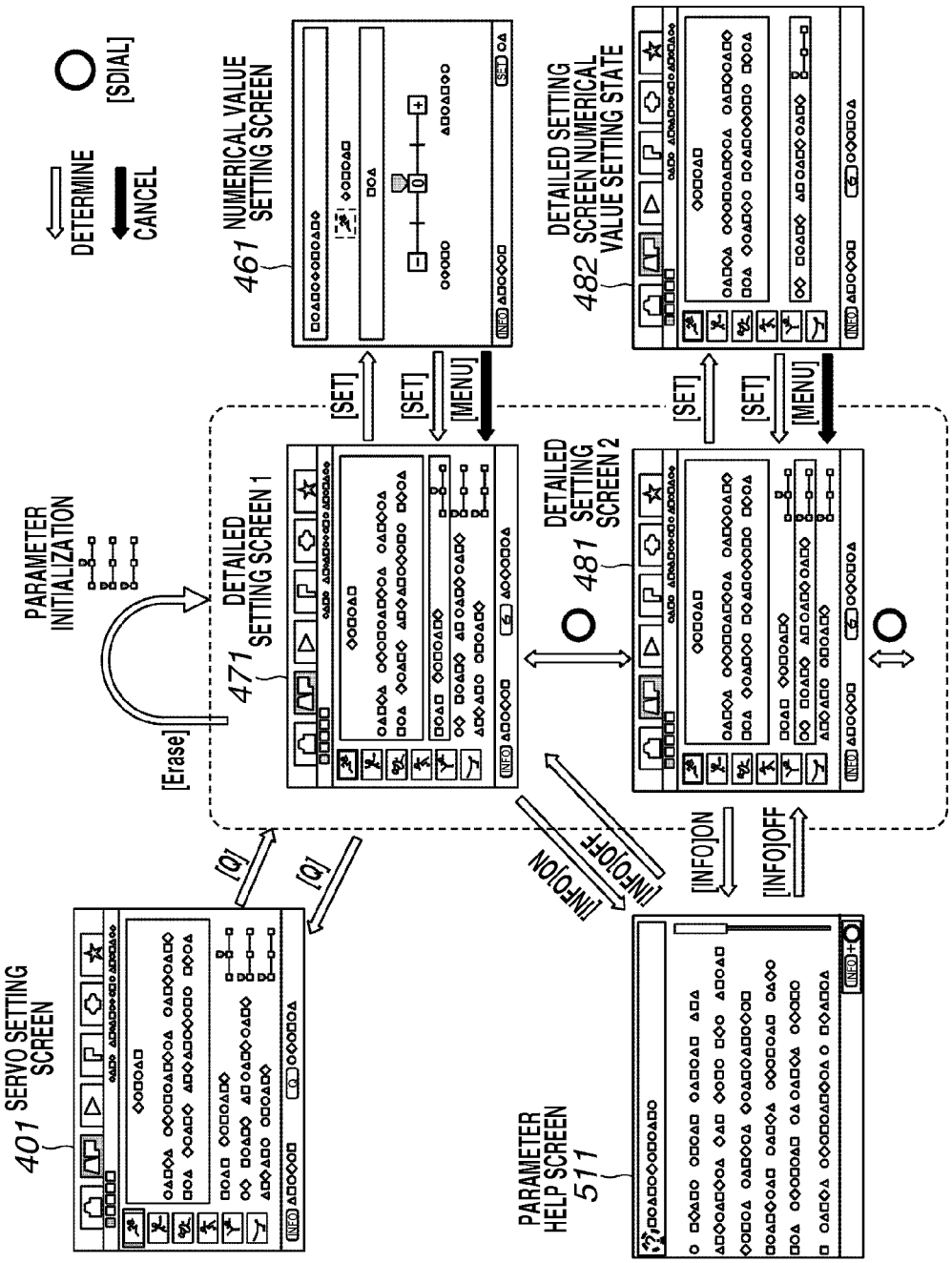
FIG. 10 illustrates a state change from the detailed setting screen.

The state transition diagram in FIG. 10 illustrates the operations of step S306 and steps S310 to S323. When the queue button 207 is turned on on the servo setting screen 401, the detailed setting screen 1 (471) is displayed. By operating the sub-electronic dial 212, the parameter to be changed in numerical value is selected (screen (471) ↔ screen (481) ↔ ). By operating the set button 213, screens (461 and 482) for changing the numerical values are displayed. On the numerical value changing screens (461 and 482), values are determined by the set button 213, and canceled by the menu button 206. The parameter help screen 511 is displayed by the information button 205.

When the erase button 209 is turned on on the detailed setting screens (471, 481, . . . ), the three types of parameters are returned to the initial setting values.

In the present exemplary embodiment, there are three setting items (parameters 1, 2, and 3). However, the number of setting items needs to be plural, namely, two or more.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-105427 filed May 10, 2011, which is hereby incorporated by reference herein in its entirety.

What is claimed is:

1. A control apparatus for controlling an imaging apparatus that includes a focus detection unit configured to detect a focus state of an image forming optical system, the control apparatus comprising:
   a selection unit configured to be able to select, as an autofocus operation mode of an optical system, a first autofocus operation mode of the optical system and a second autofocus operation mode of the optical system;
   a storage unit configured to store a plurality of setting values of setting items, wherein the setting items concern object following characteristics and are different from each other, and wherein the storage unit is configured to store the plurality of setting values so that a plurality of setting values in the second autofocus operation mode of the optical system are different from a plurality of setting values in the first autofocus operation mode of the optical system;
   a setting unit configured to read setting values corresponding to the selected operation mode from the storage unit and set setting values read from the storage unit; and
   a setting value changing unit configured to change setting values set by the setting unit, wherein the setting unit stores the changed setting values in the storage unit and associates the changed setting values with the first autofocus operation mode or the second autofocus operation mode,
   wherein an operation of the focus detection unit is controlled with the plurality of setting values stored in the storage unit, and
   wherein, the differing plurality of setting values in the first and second autofocus operation modes of the optical system, produce differing object following characteristics for each of the first and second autofocus operation modes of the optical system, respectively.

2. The control apparatus according to claim 1, wherein the setting value changing unit can change a setting value of at least one of the setting items to a plus setting and a minus setting.

3. The control apparatus according to claim 1, wherein a second setting value easier in following than a first setting value and a third setting value not easier in following than the first setting value can be set.

4. The control apparatus according to claim 1, wherein the setting value changing unit can change a setting value of at least one of the setting items to a plus setting.

5. The control apparatus according to claim 4, wherein the setting item corresponds to following characteristics with respect to a speed change of an object.

6. The control apparatus according to claim 4, wherein the setting item corresponds to a change of a threshold value for changing an autofocus (AF) frame to another AF frame.

7. The control apparatus according to claim 1, wherein a setting value changed by the setting changing unit can be returned to the setting value.

8. The control apparatus according to claim 1, further comprising a display unit configured to display the operation mode, the setting items, and the setting values on a setting screen.

9. The control apparatus according to claim 8, wherein the display unit displays a setting value changed by the setting value changing unit together with the setting value.

* * * * *